United States Patent
Dokuni

(10) Patent No.: US 7,916,367 B2
(45) Date of Patent: Mar. 29, 2011

(54) IMAGE READER AND IMAGE READING METHOD

(75) Inventor: Kenji Dokuni, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 470 days.

(21) Appl. No.: 12/062,632

(22) Filed: Apr. 4, 2008

(65) Prior Publication Data

US 2008/0247006 A1 Oct. 9, 2008

(30) Foreign Application Priority Data

Apr. 6, 2007 (JP) .................................. 2007-100441

(51) Int. Cl.
*G03F 3/08* (2006.01)
(52) U.S. Cl. ........................................ 358/523; 358/2.1
(58) Field of Classification Search .................. 358/523, 358/2.1
See application file for complete search history.

(56) References Cited

U.S. PATENT DOCUMENTS

| 6,048,117 | A | 4/2000 | Banton |
| 2008/0180706 | A1 | 7/2008 | Yanagi |

FOREIGN PATENT DOCUMENTS

| AU | 2005202009 A1 | 1/2006 |
| EP | 1 349 374 A1 | 10/2003 |
| JP | 09-074463 A | 3/1997 |
| JP | 11-146149 A | 5/1999 |
| JP | 2002-044367 A | 2/2002 |
| JP | 2002-252758 A | 9/2002 |
| JP | 2003-032504 A | 1/2003 |
| JP | 2003032504 | * 1/2003 |
| JP | 2004-357074 A | 12/2004 |
| JP | 2005-260386 A | 9/2005 |
| JP | 2005-304092 A | 10/2005 |
| JP | 2005304092 | * 10/2005 |
| JP | 2006-067309 A | 3/2006 |
| JP | 2008-187466 A | 8/2008 |

OTHER PUBLICATIONS

Official communication issued in counterpart European Application No. 08003597.5, mailed on Nov. 17, 2008.
All References Considered Except Where Lined Through. n. B./.
Official Communication issued in corresponding Japanese Patent Application No. 2007-100441, mailed on Jul. 14, 2009.

* cited by examiner

*Primary Examiner* — Twyler L Haskins
*Assistant Examiner* — Michael Burleson
(74) *Attorney, Agent, or Firm* — Keating & Bennett, LLP

(57) ABSTRACT

An image reader includes a first read unit, a second read unit independent of the first read unit, a determination unit, a storage unit, and a correction unit. The first read unit reads a first face of a fed document to create image data. The second read unit reads a second face of the fed document to create the image data. The determination unit determines the read unit that has read a recording face of a test chart when a test chart document, with a test chart recorded on one face, is read. The storage unit stores the read unit that has read the recording face of the test chart and sampling data extracted from image data created by the read unit that has read the recording face of the test chart in association with each other. The correction unit corrects read characteristics of the read unit associated with the sampling data, based on the sampling data.

12 Claims, 6 Drawing Sheets

IMAGE READER AND IMAGE READING METHOD

CROSS-REFERENCE TO RELATED APPLICATIONS

This application claims priority under 35 U.S.C. 119 to Japanese Patent Application No. 2007-100441, filed on Apr. 6, 2007, which application is hereby incorporated by reference in its entirety.

BACKGROUND OF THE INVENTION

1. Field of the Invention

The present invention relates to an image reader capable of reading both sides of a document simultaneously.

2. Description of the Related Art

In an image reader having a front face read unit that reads a front face of the document and a back face read unit that reads a back face of the document which is capable of reading both sides of the document simultaneously, read characteristics of the front face read unit and the back face read unit can be corrected by using a test chart.

In addition, in the image reader capable of reading both sides of the document, a technique is known such as determining whether or not the front face and the back face of the document is a print side.

However, in a conventional image reader, when the read characteristics are corrected by using a test chart document with a test chart recorded on both sides, there is a problem that the influence of "show-through" makes it difficult to perform accurate correction.

Meanwhile, in the conventional image reader, when the read characteristics are corrected by using the test chart document with the test chart recorded on one face, there is a problem that a complicated operation for designating the reading side is required, or an inversion mechanism for inverting the front face and the back face of the test chart document needs to be disposed in the image reader.

SUMMARY OF THE INVENTION

In order to overcome the problems described above, preferred embodiments of the present invention provide an image reader capable of reading both sides of a document simultaneously and correcting the read characteristics of the read unit by a simple operation without being influenced by show-through.

According to a preferred embodiment of the present invention, the image reader preferably includes a first read unit, a second read unit independent of the first read unit, a determination unit, a storage unit, and a correction unit. The first read unit reads a first face of a fed document to create image data. The second read unit reads a second face of the fed document to create image data. The determination unit determines which read unit has read a recording face of a test chart when the test chart document having a test chart recorded on one face is read. The storage unit stores the read unit that has read the recording face of the test chart and sampling data extracted from the image data created by the read unit that has read the recording face of the test chart in association with each other. Based on the sampling data, the correction unit corrects the read characteristics of the read unit which is associated with the sampling data.

According to a preferred embodiment of the present invention, the image reader preferably includes a first read unit that reads the first face of the document and the second read unit that reads the second face, wherein the read characteristics of the read unit can be corrected by a simple operation without being influenced by show-through.

According to another preferred embodiment of the present invention, the determination unit preferably compares the image data created by the first read unit and the image data created by the second read unit to determine which read unit has read the recording face of the test chart. Thus, the read unit that has read the recording face of the test chart can be accurately determined.

According to another preferred embodiment of the present invention, the image reader preferably further includes a feeding unit that acquires the documents one by one from a document group placed on a document tray to feed the documents to the first read unit and the second read unit. The feeding unit feeds a document to the first read unit and the second read unit when at least one of the sampling data extracted from the image data created by reading the recording face of the test chart with the first read unit and the sampling data extracted from the image data created by reading the recording face of the test chart with the second read unit is not obtained and the document is placed on the document tray. Thus, feeding of the document to the first read unit and the second read unit is continued until both the first read unit and the second read unit read the recording face of the test chart, thereby making it possible to read the test chart by a simple operation.

The image reader preferably further includes a display unit arranged to display whether or not the sampling data is already stored in the storage unit. Thus, it is possible to know whether or not the sampling data is already stored in the storage unit.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

1. Structure of a Digital Multifunction Peripheral Device

Figure 1:
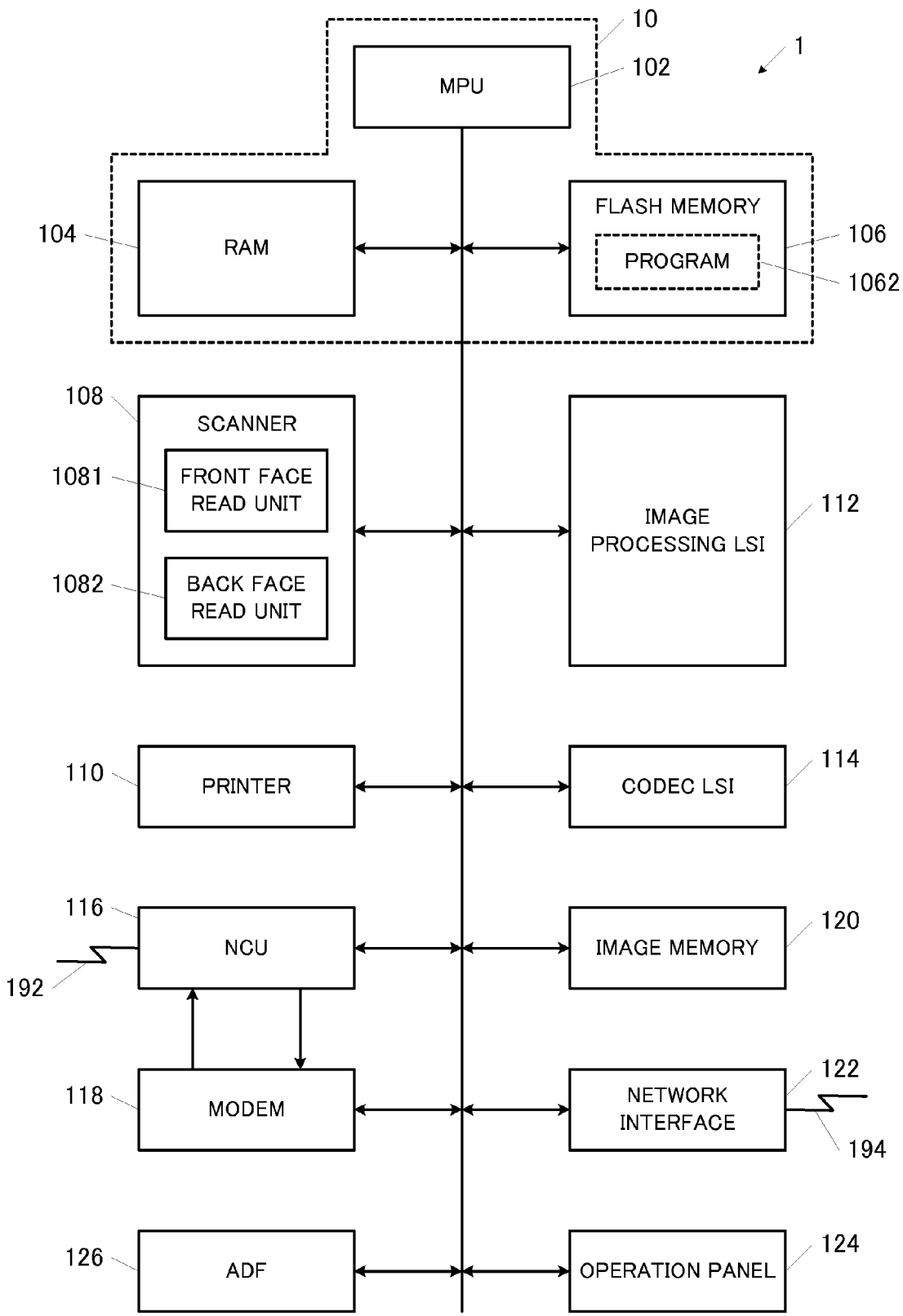
FIG. 1 is a block diagram of a digital multifunction peripheral device.

FIG. 1 is a block diagram illustrating a structure of a digital multifunction peripheral device 1 according to a preferred embodiment of the present invention. The digital multifunction peripheral device 1 is also called an MFP, and preferably has a facsimile function, a copy function, a scan function, and a print function.

As shown in FIG. 1, the digital multi function peripheral device 1 includes an MPU (Micro-Processing Unit) 102, a RAM (main storage device) 104, and a flash memory (auxiliary storage device) 106 as constituent elements of an embedded computer 10. The MPU 102 performs overall control of each element of the digital multifunction peripheral device 1 in accordance with a program 1062 stored in the flash memory 106. The program 1062 is loaded into the RAM 104 and, in addition, data required for executing the program 1062 is stored in the RAM 104.

Further, the digital multifunction peripheral device 1 preferably includes a scanner 108, a printer 110, an image processing LSI (Large Scale Integration) 112, a codec LSI 114, an NCU (Network Control Unit) 116, a modem 118, an image memory 120, a network interface 122, an operation panel 124, and an ADF (Automatic Document Feeder) 126.

The scanner 108 reads the fed document to create the image data. The scanner 108 includes a front face read unit 1081 that reads a front face of a document and a back face read unit 1082 that reads a back face of the document independently of the front face. Thus, the scanner 108 can read both sides of the document simultaneously, namely, can read both sides of the document without performing switchback feeding of the document. Of course, in the digital multifunction peripheral device 1, only the front face of the document can be read by using only the front face read unit 1081, or only the back face can be read by using only the back face read unit 1082.

The printer 110 prints an image according to the image data on a recording medium such as a recording paper by an electrophotographic method, for example.

The image processing LSI 112 processes the image data. Note that a portion of or an entire function of the image processing LSI 112 may be achieved by executing the program 1062 by the embedded computer 10.

The codec LSI 114 encodes or decodes the image data by MH system, MR system, MMR system, or JPEG system. Note that a portion of or an entire function of the codec LSI 114 may be achieved by executing the program 1062 by the embedded computer 10.

The NCU 116 controls a connection to a public telephone switched network 192. The NCU 116 sends a dial signal corresponding to a telephone number of an opposite party, and detects an incoming call. The modem 118 modulates or demodulates the image data.

The image memory 120 stores the image data that will be, or has been, processed by the image processing LSI 112 in the digital multifunction peripheral device 1. The image memory 120 preferably includes an SDRAM (Synchronous Dynamic Random Access Memory), etc.

The network interface 122 connects the digital multifunction peripheral device 1 to a network 194.

The operation panel 124 detects an operation by an operator and displays various kinds of information.

The ADF 126 acquires the documents one by one from a document group placed on a document tray to feed the documents to the scanner 108. The term "document group" means not only the case of a plurality of documents but also the case of a single document.

When transmission is performed in a facsimile mode, the scanner 108 reads the document to create the image data in the digital multifunction peripheral device 1. Next, the codec LSI 114 encodes the image data created by the scanner 108. Next, the modem 118 modulates the image data encoded by the codec LSI 114 and transmits the encoded image data to a facsimile machine of an opposite party. Meanwhile, when the image data is received in a facsimile mode, the image data is received and modulated by the modem 118 from the facsimile machine of the opposite party in the digital multifunction peripheral device 1. Next, the codec LSI 114 decodes the image data demodulated by the modem 118. Next, the printer 110 prints an image according to the image data decoded by the codec LSI 114 on a recording medium.

In a copy mode of the digital multifunction peripheral device 1, the scanner 108 reads the document to create the image data, and the printer 110 prints on the recording medium the image according to the image data created by the scanner 108.

In a scan mode of the digital multifunction peripheral device 1, the scanner 108 reads the document to create the image data, the codec LSI 114 encodes the image data created by the scanner 108, and the network interface 122 transmits the image data encoded by the codec LSI 114 to a personal computer of the opposite party.

In a print mode, the network interface 122 receives the image data from the personal computer of the opposite party, and the codec LSI 114 decodes the image data received by the network interface 122, and the printer 110 prints the image according to the image data decoded by the codec LSI 114 on the recording medium.

2. Test Chart Document

Figure 2:
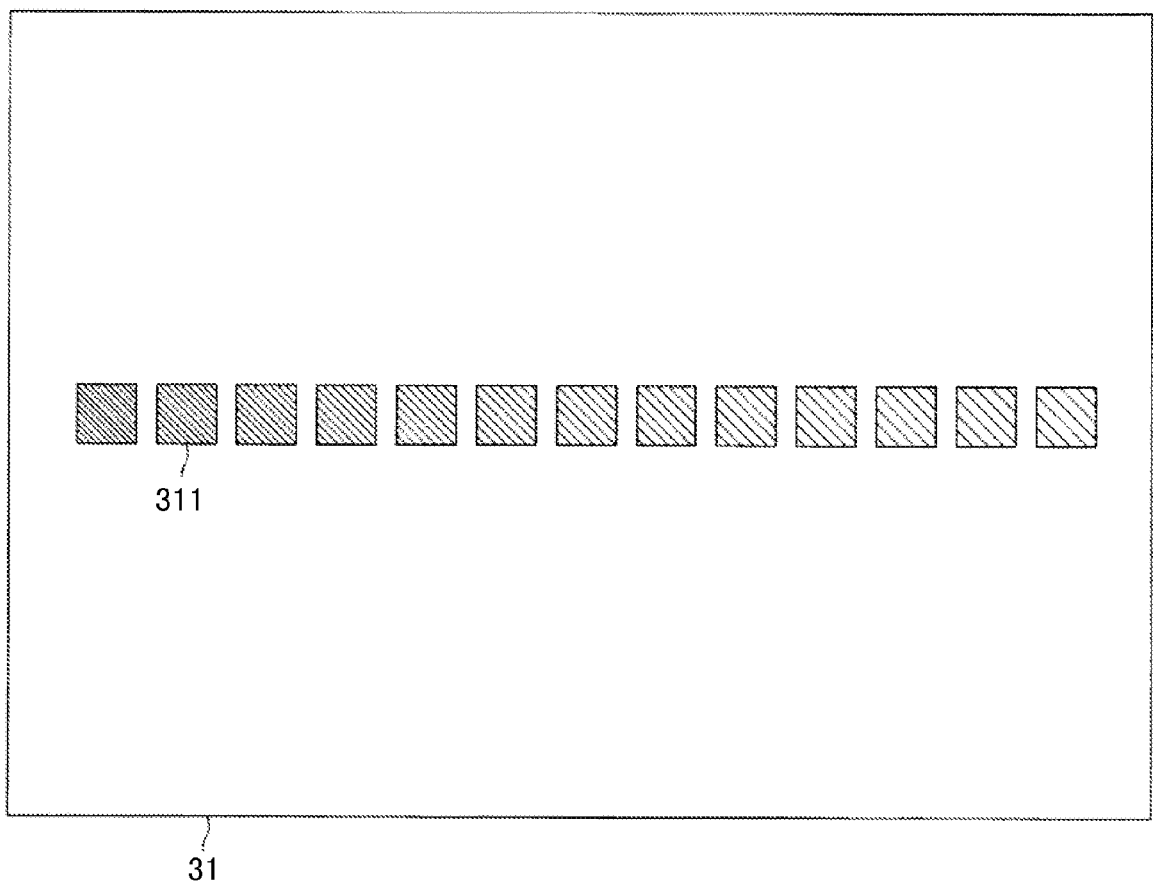
FIG. 2 is a view illustrating an example of a test chart document.
Figure 3:
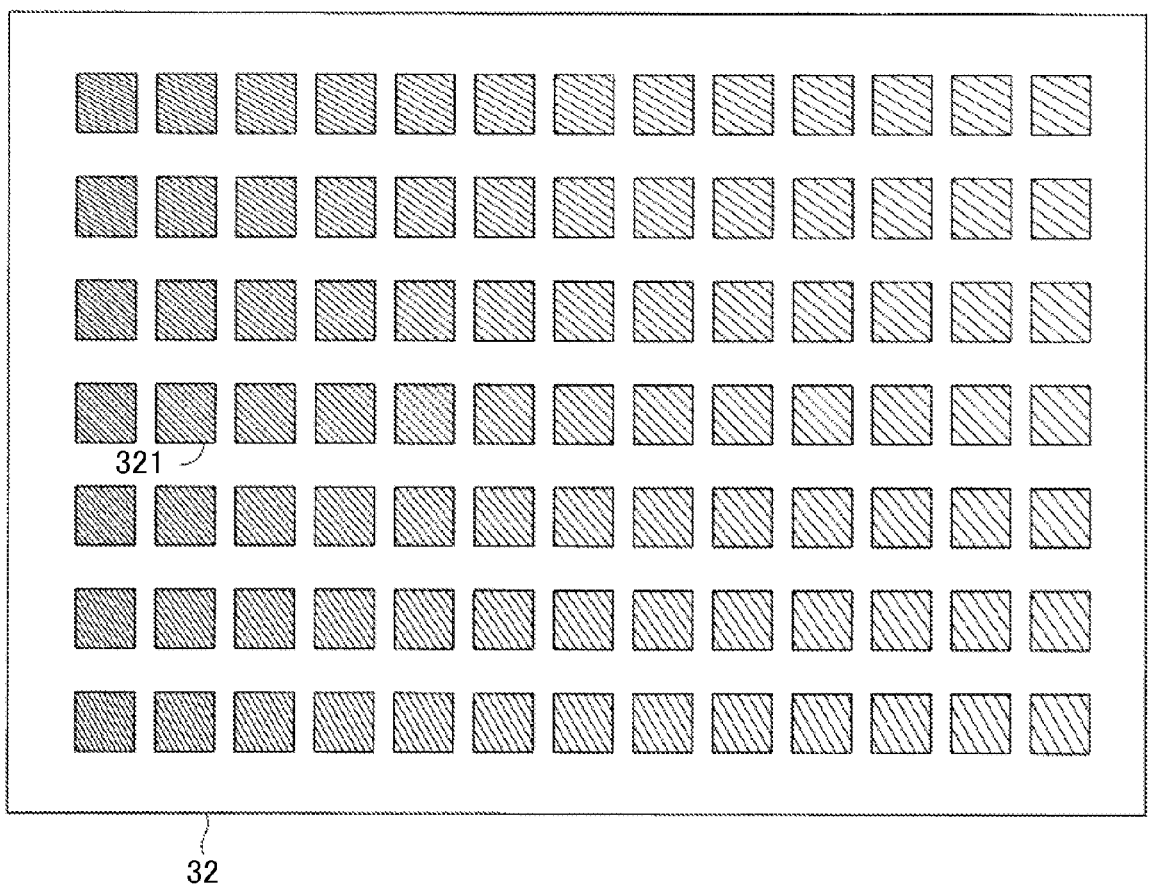
FIG. 3 is a view illustrating an example of the test chart document.

FIG. 2 and FIG. 3 are schematic views illustrating an example of test chart documents 31 and 32 used for correcting the read characteristics of the front face read unit 1081 and the back face read unit 1082. FIG. 2 exemplifies a monochromatic test chart document 31. FIG. 3 exemplifies a color test chart document 32. The test chart documents 31 and 32 are documents with the test chart recorded on one face so as to have a plurality of patches 311 and 321 with gradually changing tones arranged in a row in a sub-scanning direction. Of course, a different kind of test chart document from the test chart exemplified in FIG. 2 and FIG. 3 can also be used.

The digital multifunction peripheral device 1 samples the density data from the patches 311 and 321 when the test chart documents 31 and 32 are read. Then, when the read characteristics are corrected, a correction table is created so that the density data from the patches 311 and 321 shows a previously defined reference value. For example, a correction table capable of obtaining an appropriate white balance is created.

3. Reading of the Test Chart Document

Figure 4:
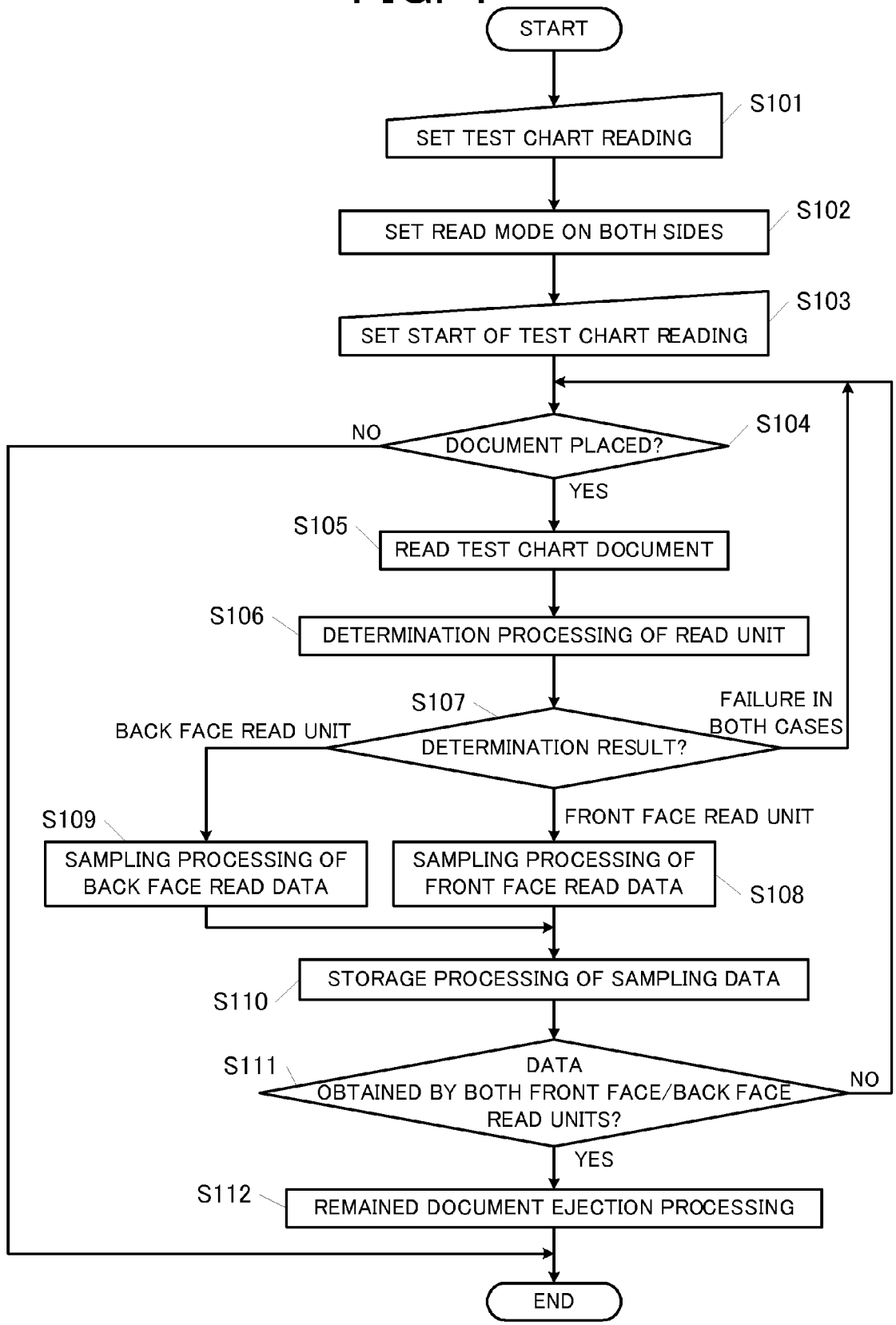
FIG. 4 is a flowchart illustrating a process flow when the test chart document is read.

FIG. 4 is a flowchart illustrating a process flow in the digital multifunction peripheral device 1 for reading the test chart document under the control of the embedded computer 10.

In reading the test chart document, first, the digital multifunction peripheral device 1 is set in a state whereby the test chart can be read by using the operation panel 124 (step S101). Then, the digital multifunction peripheral device 1 sets a reading mode to a double sided reading mode whereby both sides of the document can be read simultaneously (step S102).

Here, when a start button on the operation panel 124 is pressed and a reading start instruction of the test chart is given (step S103), the digital multifunction peripheral device 1 examines whether or not the document is placed on the document tray (step S104), and when there is no document on the document tray ("NO" in step S104), the test chart cannot be read and therefore the processing is completed as is. Meanwhile, when there is a document on the document tray ("YES" in step S104), one document is acquired from the document group on the document tray by the ADF 126 and is fed to the scanner 108. Then, the test chart document is read by using both the front face read unit 1081 and the back face read unit 1082 (step S105).

Subsequently, the digital multifunction peripheral device 1 compares the image data of the front face of the test chart document created by the front face read unit 1081 (called "front face read data" hereafter) and the image data of the back face of the test chart created by the back face read unit 1082 (called "back face read data" hereafter) to determine which read unit has read a recording face of the test chart (step S106). More specifically, a determination is made as to which of the read units of the front face read unit 1081 and the back face read unit 1082 has read the recording face of the test chart.

For example, the read unit that has created the data with a higher density out of the front face read data and the back face read data is determined as the read unit that has read the recording face of the test chart. According to a relative determination based on a comparison between the front face read data and the back face read data, a more accurate determination can be performed compared to an absolute determination based on only one of the front face read data and the back face read data. This is because when the test chart document is read, the read characteristics of the front face read unit 1081 and the back face read unit 1082 are not corrected, and therefore it is difficult to adopt a strict determination reference. In the absolute determination, there is a high possibility of erroneously recognizing show-through to a face opposite to the recording face of the test chart as the test chart.

Then, when determination is made that the front face read unit 1081 has read the recording face of the test chart ("front face read unit" in step S107), sampling processing of the front face read data is performed (step S108). When determination is made that the back face read unit 1082 has read the recording face of the test chart ("back face read unit" in step S107), sampling processing of the back face read data is performed (step S109). Here, "sampling processing" means the process of extracting the data necessary for correcting the read characteristics of the front face read unit 1081 or the back face read unit 1082 from the front face read data or the back face read data. When the test chart document exemplified in FIG. 2 and FIG. 3 is used, the "sampling processing" means the process of extracting the density data from the patches 311 and 321 from the front face read data or the back face read data. Note that when a determination is made that neither of the front face read unit 1081 nor the back face read unit 1082 has read the recording face of the test chart ("NG" in both cases in step S107), the process is returned to step S104 and the process for reading another document is started.

After the sampling processing is completed, the digital multifunction peripheral device 1 stores the extracted sampling data in the flash memory 106 so as to be associated with the read unit that has read the recording face of the test chart, namely, the read unit that has created the image data of an extraction source of this sampling data (step S110). Note that when the sampling data is already stored, already stored sampling data may be held as is, or it may be overwritten by newly obtained sampling data.

When the sampling data for both the front face read unit 1081 and the back face read unit 1082 can be obtained through the above-described process ("YES" in step S111), no more sampling data needs to be acquired. Therefore, ejection of the documents remaining on the document tray is performed without performing reading of a new document (step S112). However, when the sampling data is not obtained by both the front face read unit 1081 and the back face read unit 1082 ("NO" in step S111), namely, when at least one of the sampling data obtained by the front face read unit 1081 and the sampling data obtained by the back face read unit 1082 is not obtained, the process is returned to step S104 to start the process for reading another document so as to acquire the unobtained (not yet obtained) sampling data. As a result, sufficient sampling data is acquired.

According to such a process flow, as long as there is no document placed on the document tray, and in a state that either of the front face read unit 1081 and the back face read unit 1082 have not read the recording face of the test chart yet, the embedded computer 10 controls the ADF 126 and the feeding of documents to the scanner 108 is continued by the ADF 126. Thus, the process from step S105 to S110 is repeated, until the sampling data can be obtained by both the front face read unit 1081 and the back face read unit 1082. If viewed from a user of the digital multifunction peripheral device 1, the test chart document, with the test chart recorded on one face, is placed on the document tray so as to be facing frontward or backward, and only by performing a simple operation of step S101 and S103, sampling data necessary for correcting the read characteristics of the front face read unit 1081 and the rear face read unit 1082 can be acquired. At this time, a read order of the documents facing frontward and facing backward does not need to be considered, and even if the test chart document and a blank sheet are erroneously mixed and placed on the document tray, the sampling data can be accurately acquired. In addition, since the test chart document can be used, with the test chart recorded on one face, the influence of show-through can be prevented. Further, the inversion mechanism (switchback mechanism) for inverting the front face and the rear face of the test chart document does not need to be provided in the digital multifunction peripheral device 1. Note that such an inversion mechanism is useless in a digital multifunction peripheral device 1 capable of reading both sides of the document simultaneously, and therefore it should be omitted.

4. Correction of the Read Characteristics

Figure 5:
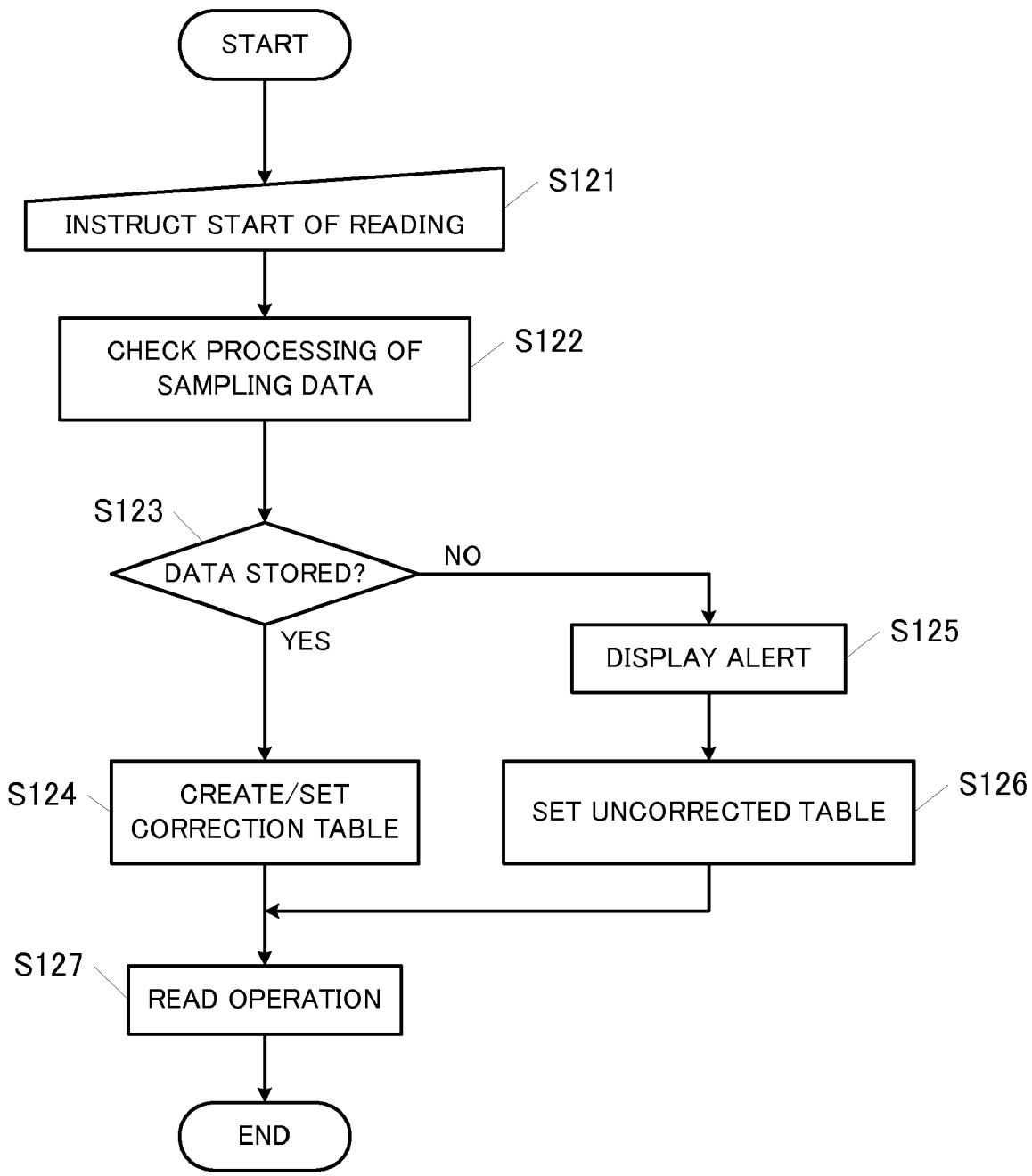
FIG. 5 is a flowchart illustrating the process flow when a document is read.

FIG. 5 is a flowchart showing a process flow in the digital multifunction peripheral device 1 when the document is read.

In reading the document, first, the start button on the operation panel 124 is pressed and a read instruction of the document is provided to the digital multifunction peripheral device 1 (step S121). In response thereto, the digital multifunction peripheral device 1 performs check processing whether or not the sampling data necessary for correcting the read characteristics of the front face read unit 1081 and the back face read unit 1082 is stored in the flash memory 106 (step S122). Here, when the sampling data is stored ("YES" in step S123), a correction table is created from the sampling data for correcting the read characteristics of the front face read unit 1081 and the back face read unit 1082, and the front face read unit 1081 and the back face read unit 1082 are set in a state whereby this correction table can be used (step S124). Thus, in the digital multifunction peripheral device 1, based on the sampling data, the read characteristics of the read unit associated with the sampling data can be corrected.

Meanwhile, if the sampling data is not stored in the flash memory 106, an alert is displayed by using the operation panel 124 (step S125), and the front face read unit 1081 and the back face read unit 1082 are set in a state that an uncorrected table can be used (step S126).

After setting of the correction table or the uncorrected table is completed, the digital multifunction peripheral device 1 acquires one sheet of the documents from the document group by the ADF 126 to feed the document to the scanner 108, and reads the document by using both the front face read unit 1081 and the back face read unit 1082 (step S127).

5. Display of a Processing Result of the Sampling Processing

Figure 6:
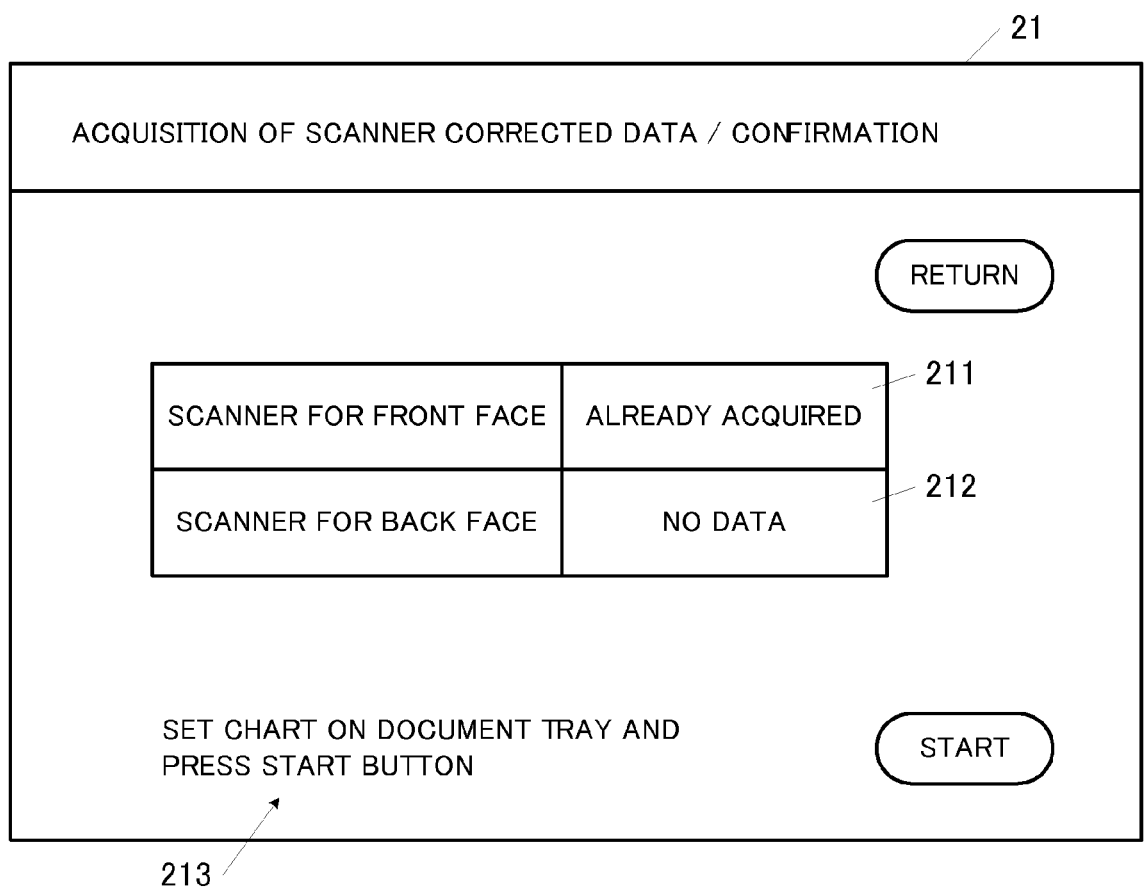
FIG. 6 is a view illustrating a screen for displaying a processing result of sampling processing.

FIG. 6 is a view showing a screen 21 for displaying a processing result of the sampling processing capable of calling the processing result on the operation panel 124.

As shown in FIG. 6, sections 211 and 212 are provided on the screen 21 for displaying whether or not the sampling data associated with each of the front face read unit (scanner for front face) 1081 and the back face read unit (scanner for back face) 1082 is stored in the flash memory 106. Note that "already acquired" displayed in the section 211 shows that the sampling data associated with the front face read unit 1081 is already stored in the flash memory 106, and "no data" displayed in the section 212 shows that the sampling data associated with the back face read unit 1082 is not stored in the flash memory 106 yet.

According to such a display, it is possible to know whether or not the sampling data is already stored. More specifically, it is possible to easily know whether correction of the read characteristics of the front face read unit 1081 and the back face read unit 1082 is prepared. In the case where correction of the read characteristics of the front face read unit 1081 and the back face read unit 1082 is not prepared, when the test chart document is placed on the document tray and the start button of the operation panel 124 is pressed according to a guide 213 showing "set a chart on the document tray and press a start button", sufficient sampling data can be acquired according to a process flow shown in the flowchart of FIG. 4.

6. Other Preferred Embodiments

In the aforementioned preferred embodiments, explanation has been given to an example of applying preferred embodiments of the present invention to a digital multifunction peripheral device 1 having a function of a scanner (image reader). However, it is a matter of course that the present invention can be applied to a scanner dedicated machine, or other types of machines, etc.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image reader comprising:
    a first read unit that reads a first face of a document to create image data;
    a second read unit, independent of the first read unit, that reads a second face of the document to create image data;
    a determination unit that determines which one of the first and second read units has read a recording face of a test chart when a test chart document, with the test chart recorded on one face, is read;
    a storage unit that stores the one of the first and second read units that has read the recording face of the test chart and that stores sampling data extracted from the image data created by the one of the first and second read units that has read the recording face of the test chart in association with each other; and
    a correction unit that corrects read characteristics of the read unit associated with the sampling data, based on the sampling data; wherein
    the determination unit is arranged to compare the image data created by the first read unit and the image data created by the second read unit to determine which one of the first and second read units has read the recording face of the test chart.

2. The image reader according to claim 1, wherein the determination unit compares density of the image data created by the first read unit and density of the image data created by the second read unit to determine which one of the first and second read units has read the image data with higher density as the one of the first and second read units that has read the recording face of the test chart.

3. The image reader according to claim 1, further comprising:
    a feeding unit arranged to acquire documents one by one from a document group placed on a document tray to feed the document to the first read unit and the second read unit; wherein
    if a document is placed on the document tray, the feeding unit feeds the document to the first read unit and the second read unit when at least one of the sampling data extracted from the image data created by reading the recording face of the test chart with the first read unit and the sampling data extracted from the image data created by reading the recording face of the test chart with the second read unit has not obtained.

4. The image reader according to claim 1, further comprising a display unit that displays whether or not the sampling data is already stored in the storage unit.

5. The image reader according to claim 1, wherein the sampling data is data obtained by extracting the data necessary for correcting read characteristics of the first read unit or the second read unit from the image data created by the first read unit or the image data created by the second read unit.

6. The image reader according to claim 5, wherein the sampling data is obtained by extracting density data from a patch on the test chart document from the image data created by reading the test chart document with the first read unit or the image data created by reading the test chart document with the second read unit.

7. An image reading method, comprising:
    a first reading step of simultaneously reading a first face and a second face of a test chart document, and creating image data of the first face and image data of the second face;
    a determining step of determining whether either of the image data of the first face and the second face is the image data which has been read out from a recording face of a test chart based on the image data of the first face and the image data of the second face;
    an extracting step of extracting sampling data from the image data which has been read out from the recording face of the test chart;
    a storing step of storing a read unit that has read the recording face of the test chart and the sampling data in association with each other, selected from a first read unit that has created the image data of the first face and a second read unit that has created the image data of the second face; and
    a correcting step for correcting read characteristics of the read unit associated with the sampling data based on the stored sampling data; wherein
    in the determining step, the image data of the first face and the image data of the second face are compared to determine the image data which has been read out from the recording face of the test chart.

8. The image reading method according to claim 7, wherein in the determining step, density of the image data of the first face and density of the image data of the second face are compared to determine the image data with higher density as the image data which has been read out from the recording face of the test chart.

9. The image reading method according to claim 7, further comprising:

a feeding step of acquiring documents one by one from a document group placed on a document tray to feed the document to the first read unit and the second read unit; wherein in the feeding step, when at least one of the sampling data extracted from the image data created by reading the recording face of the test chart with the first read unit and the sampling data extracted from the image data created by reading the recording face of the test chart with the second read unit is not obtained and a document is on the document tray, the document is fed to the first read unit and the second read unit.

10. The image reading method according to claim 7, further comprising:

a displaying step of displaying whether or not the sampling data is already stored in the storing step.

11. The image reading method according to claim 7, wherein the sampling data is obtained by extracting data necessary for correcting read characteristics of the first read unit or the second read unit from the image data created by the first read unit and the image data created by the second read unit.

12. The image reading method according to claim 11, wherein the sampling data is extracted density data from a patch on the test chart document based on the image data created by reading the test chart document with the first read unit and the image data created by reading the test chart document with the second read unit.

* * * * *